No. 748,316. PATENTED DEC. 29, 1903.
A. SIEBELIST.
INNER CONTAINING VESSEL FOR COOKING UTENSILS.
APPLICATION FILED JULY 18, 1902.
NO MODEL.
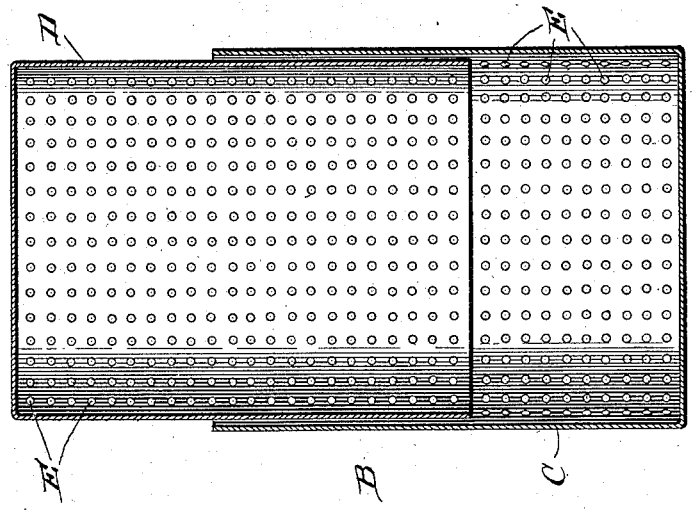
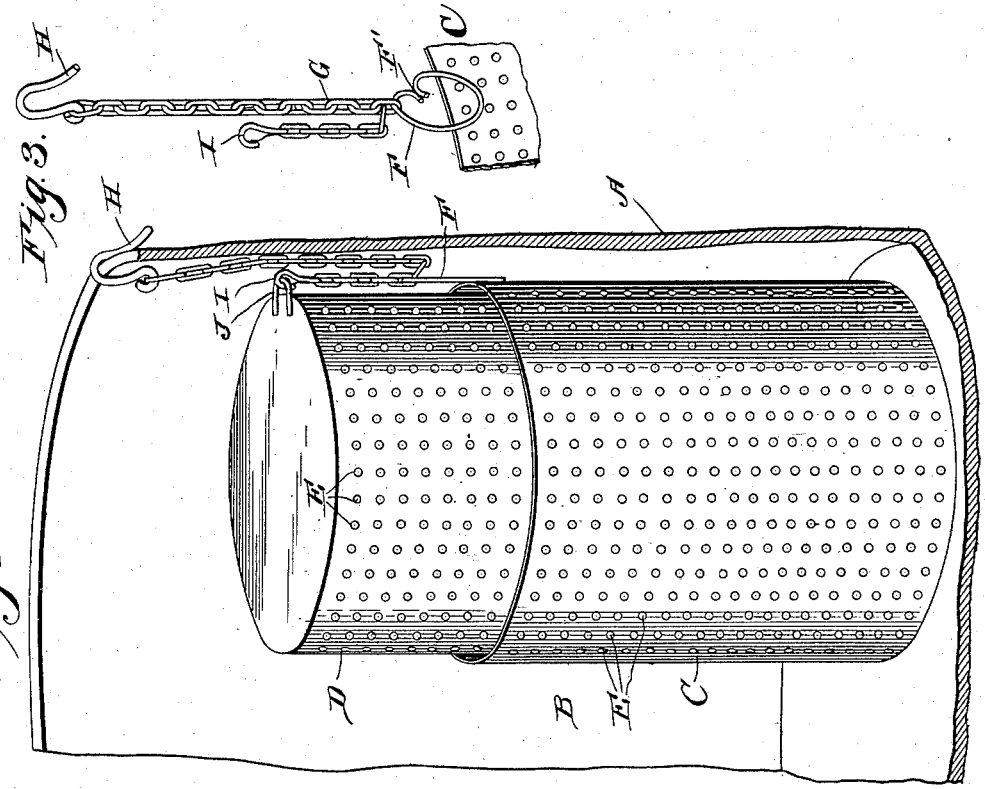
Witnesses
Louis D. Heinrichs
L. H. Morrison
Inventor
Arthur Siebelist
By his Attorney No. 748,316.

Patented December 29, 1903.

UNITED STATES PATENT OFFICE.

ARTHUR SIEBELIST, OF PHILADELPHIA, PENNSYLVANIA.

INNER CONTAINING VESSEL FOR COOKING UTENSILS.

SPECIFICATION forming part of Letters Patent No. 748,316, dated December 29, 1903.

Application filed July 18, 1902. Serial No. 116,049. (No model.)

*To all whom it may concern:*

Be it known that I, ARTHUR SIEBELIST, a citizen of the United States, residing at Philadelphia, county of Philadelphia, and State of Pennsylvania, have invented a certain new and useful Improvement in Inner Containing Vessels for Cooking Utensils, of which the following is a specification.

My invention relates to a new and useful improvement in inner containing vessels for cooking utensils, and has for its object to provide a receptacle or vessel with perforated walls in which is adapted to be placed the soup-stock and soup-bones used in making soup, so as to do away with the necessity of straining the soup after it has been made.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a vertical section of a cooking utensil, showing my invention inserted therein; Fig. 2, a vertical sectional view of the perforated vessel; Fig. 3, a perspective view of the chain attachment.

Referring to the drawings, A represents the cooking utensil, and B is my improved inner perforated containing vessel, which consists of the two parts C and D. Each of said parts is cup-shaped and open at one end, and they are inverted relative to one another. One part is made smaller than the other, so that the parts may telescope, as shown in Fig. 2. Each of these parts C and D is perforated, as indicated at E, and to the part C is secured by soldering or otherwise the divided ring F. This ring F has its ends F' inturned at one side of the ring, so that one of the links of a chain G may be passed between these ends, and thereby secured to the ring F, and the opening in the ring being to one side and the chain extending upward in a vertical direction will prevent said chain from ever becoming accidentally disengaged from the ring F. One end of the chain has secured to it a snap-hook I, which is adapted to be snapped over an eye J, soldered to the part D at its upper end. The chain then passes downward and is hooked, as before described, in the ring F and from there passes upward and is provided upon its upper end with the hook H, which is adapted to hook over the edge of the cooking utensil.

When the apparatus is to be used in making soups and the like, the soup-stock and soup-bones, &c., are inserted within the containing vessel B, and this vessel being perforated allows the liquid to have free access to the interior of the vessel, and the substance is extracted from the articles contained in the vessel the same as if they were placed directly in the cooking utensil; but the perforations in the vessel B are not large enough to allow any of the solid portions to escape, and thus after the soup has been properly boiled the liquid is clear and free from any particles, so that it may be poured or dipped directly from the pot without being strained, which is a great advantage, as it saves time and labor and also does away with the cooling of the liquor while being strained.

The principal feature of my invention is that the vessel being formed of two parts, telescoping one into the other, makes it adjustable, so as to accommodate either large or small soup-bones, and for the purpose of securing the upper part D in any position placed I provide upon the outside of the same a hook I, which is adapted to be hooked in one of the links of the chain G, thus holding the part D in any position placed. After the soup or other contents has been made the vessel B, together with its contents, may be withdrawn from the cooking utensil by means of the hook H and chain G.

Of course I do not wish to be limited to the exact construction here shown, as slight modifications could be made without departing from the spirit of my invention.

Having thus fully described my invention, what I claim as new and useful is—

1. In a device of the character described, a vessel composed of two cup-shaped parts, said parts being inverted relative to one another, one part adapted to slide in the other part, the entire walls of said parts being perforated, a chain adapted to extend from the device upward to the upper rim of the cooking utensil described, in which the vessel is inserted, said chain adapted to form a means for securing the two parts of the vessel against separation, as and for the purpose specified.

2. In a device of the character described, a perforated vessel composed of two cup-shaped parts, one larger than the other in diameter, the smaller one adapted to be inserted open end downward into the larger part, a divided ring secured to the larger part, the opening in said ring being to one side, a chain adapted to be inserted in said ring and extending upward, a hook provided upon the upper end of the chain adapted to hook over the upper edge of the cooking utensil described, an eye secured to the upper receptacle to which is adapted to be removably secured the other end of the chain to hold the receptacles in the proper position, substantially as described and for the purpose specified.

In testimony whereof I have hereunto affixed my signature in the presence of two subscribing witnesses.

ARTHUR SIEBELIST.

Witnesses:
MORRIS S. RANKEN,
L. W. MORRISON.